US011310359B2

(12) United States Patent
Santamaria et al.

(10) Patent No.: US 11,310,359 B2
(45) Date of Patent: Apr. 19, 2022

(54) OPTIONS PRESENTED ON A DEVICE OTHER THAN ACCEPT AND DECLINE FOR AN INCOMING CALL

(71) Applicant: Apple Inc., Cupertino, CA (US)

(72) Inventors: Justin Santamaria, San Francisco, CA (US); Marcel van Os, San Francisco, CA (US); Donald W. Pitschel, San Francisco, CA (US); Elizabeth C. Cranfill, San Francisco, CA (US); Jeremy Brown, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/949,381

(22) Filed: Oct. 28, 2020

(65) Prior Publication Data

US 2021/0044694 A1    Feb. 11, 2021

Related U.S. Application Data

(63) Continuation of application No. 14/810,325, filed on Jul. 27, 2015, now Pat. No. 10,855,833, which is a
(Continued)

(51) Int. Cl.
*H04M 1/72484* (2021.01)
*G06F 3/0488* (2013.01)
(Continued)

(52) U.S. Cl.
CPC ...... *H04M 1/72484* (2021.01); *G06F 3/0482* (2013.01); *G06F 3/04847* (2013.01);
(Continued)

(58) Field of Classification Search
CPC ............. G06F 1/1626; G06F 1/1632; H04M 1/72527; H04M 1/7253; H04M 3/42042; H04W 88/02; H04W 76/10
See application file for complete search history.

(56) References Cited

U.S. PATENT DOCUMENTS

| 6,957,076 | B2 | 10/2005 | Hunzinger | H04W 4/029 455/456.3 |
| 7,084,758 | B1* | 8/2006 | Cole | H04M 1/72451 340/539.11 |

(Continued)

FOREIGN PATENT DOCUMENTS

| CN | 101170604 A | 4/2008 |
| CN | 101198161 A | 6/2008 |

(Continued)

OTHER PUBLICATIONS

Communication pursuant to Rules 70(2) and 70a(2) EPC and reference to Rule 39(1) EPC received for European Patent Application No. 14194099.9, dated May 6, 2015, 2 pages.
(Continued)

*Primary Examiner* — Dung Hong
(74) *Attorney, Agent, or Firm* — Womble Bond Dickinson (US) LLP

(57) ABSTRACT

A data processing system that, in one embodiment, uses smart reminders to allow a user to decline an incoming phone or messaging call and to cause the system to set a smart reminder about the call. In one embodiment, the system can use the system's current state or context (e.g. the system is in a car or is playing a movie) to determine the type of reminder options to present to the user and to determine when to trigger the reminder based on the reminder option that is selected by the user.

20 Claims, 10 Drawing Sheets

Related U.S. Application Data continuation of application No. 13/488,696, filed on Jun. 5, 2012, now Pat. No. 9,124,712.

(51) Int. Cl.

| | | |
|---|---|---|
| *H04W 4/80* | (2018.01) | |
| *H04M 1/724* | (2021.01) | |
| *H04M 1/72403* | (2021.01) | |
| *H04M 1/72436* | (2021.01) | |
| *H04M 1/72445* | (2021.01) | |
| *G06F 3/0482* | (2013.01) | |
| *G06F 3/0484* | (2013.01) | |
| *H04M 3/42* | (2006.01) | |
| *H04M 1/72454* | (2021.01) | |
| *H04M 1/72457* | (2021.01) | |
| *H04W 84/04* | (2009.01) | |
| *H04W 84/12* | (2009.01) | |
| *G06F 3/04883* | (2022.01) | |
| *G06F 3/04847* | (2022.01) | |

(52) U.S. Cl.
CPC ........ *G06F 3/04883* (2013.01); *H04M 1/724* (2021.01); *H04M 1/72403* (2021.01); *H04M 1/72436* (2021.01); *H04M 1/72445* (2021.01); *H04M 3/42* (2013.01); *H04W 4/80* (2018.02); *H04M 1/72454* (2021.01); *H04M 1/72457* (2021.01); *H04M 2250/22* (2013.01); *H04M 2250/68* (2013.01); *H04W 84/042* (2013.01); *H04W 84/12* (2013.01)

(56) References Cited

U.S. PATENT DOCUMENTS

| | | | | |
|---|---|---|---|---|
| 7,647,042 | B2* | 1/2010 | Willey | H04M 1/72516 455/421 |
| 9,008,631 | B2* | 4/2015 | Small | H04M 3/42 455/414.1 |
| 9,124,712 | B2 | 9/2015 | Santamaria | H04M 3/42 |
| 2001/0029194 | A1* | 10/2001 | Ketola | H04M 1/575 455/567 |
| 2004/0204068 | A1 | 10/2004 | Komaki | |
| 2005/0070338 | A1 | 3/2005 | Nagahama et al. | |
| 2005/0265318 | A1* | 12/2005 | Khartabil | H04M 3/436 370/328 |
| 2006/0061488 | A1 | 3/2006 | Dunton | |
| 2006/0141926 | A1 | 6/2006 | Anttila | H04M 3/436 455/3.06 |
| 2007/0004383 | A1* | 1/2007 | Agozo | H04M 3/42195 455/414.1 |
| 2007/0129888 | A1* | 6/2007 | Rosenberg | G01C 21/20 701/433 |
| 2008/0132209 | A1* | 6/2008 | Willey | H04M 1/72516 455/412.2 |
| 2008/0132296 | A1 | 6/2008 | Willey | |
| 2009/0061832 | A1* | 3/2009 | Goggans | H04M 19/04 455/414.1 |
| 2009/0119100 | A1 | 5/2009 | Akella et al. | |
| 2009/0197621 | A1* | 8/2009 | Book | H04M 1/575 455/457 |
| 2009/0264117 | A1* | 10/2009 | Hsieh | H04M 1/576 455/418 |
| 2009/0273587 | A1 | 11/2009 | Tsuei et al. | |
| 2009/0285383 | A1* | 11/2009 | Tsuei | H04M 1/0202 379/242 |
| 2009/0290696 | A1* | 11/2009 | K. N. | H04M 1/72451 379/142.04 |
| 2010/0011119 | A1 | 1/2010 | Knowlton et al. | |
| 2010/0159978 | A1* | 6/2010 | Sierawski | H04M 1/72466 455/550.1 |
| 2010/0162169 | A1* | 6/2010 | Skarp | G06F 3/0488 715/833 |
| 2010/0261505 | A1 | 10/2010 | Yeh et al. | |
| 2011/0076989 | A1* | 3/2011 | Lynch | H04M 1/7243 455/412.1 |
| 2011/0176670 | A1* | 7/2011 | Kaplan | H04W 4/16 379/210.01 |
| 2011/0219080 | A1 | 9/2011 | McWithey et al. | |
| 2011/0300884 | A1* | 12/2011 | Ollila | H04M 1/72403 455/466 |
| 2012/0052920 | A1* | 3/2012 | Kobayashi | H04M 1/724 455/566 |
| 2012/0077463 | A1* | 3/2012 | Robbins | H04W 60/00 455/411 |
| 2012/0094718 | A1* | 4/2012 | Kim | H04M 1/72484 455/559 |
| 2013/0145295 | A1* | 6/2013 | Booking | G06F 3/04883 715/764 |
| 2013/0222268 | A1* | 8/2013 | Greisson | H04M 1/724 345/173 |
| 2013/0254705 | A1* | 9/2013 | Mooring | G06F 3/0482 715/784 |
| 2013/0297198 | A1 | 11/2013 | Vande Velde et al. | |
| 2013/0303087 | A1 | 11/2013 | Hauser et al. | |
| 2014/0187226 | A1* | 7/2014 | Cui | H04M 1/663 455/418 |
| 2014/0310643 | A1* | 10/2014 | Karmanenko | G06F 1/1647 715/784 |
| 2018/0255177 | A1* | 9/2018 | Scott | H04M 1/57 |

FOREIGN PATENT DOCUMENTS

| | | |
|---|---|---|
| CN | 101547255 A | 9/2009 |
| CN | 101794196 A | 8/2010 |
| CN | 101883173 A | 11/2010 |
| CN | 20169978 U | 1/2011 |
| CN | 201699785 U | 1/2011 |
| CN | 102200882 A | 9/2011 |
| EP | 1 111 884 A2 | 6/2001 |
| EP | 1 111 884 A3 | 1/2004 |
| EP | 2 120 436 A1 | 11/2009 |
| EP | 2 387 217 A2 | 11/2011 |
| JP | 2001-217920 A | 8/2001 |
| JP | 2003-19964 | 7/2003 |
| JP | 2003-199164 A | 7/2003 |
| JP | 2004-312579 A | 11/2004 |
| JP | 2006094421 | 4/2006 |
| JP | 2006-157718 | 6/2006 |
| JP | 2009-253708 | 10/2009 |
| JP | 2011-205576 A | 10/2011 |
| KR | 1020020033326 | 5/2007 |
| KR | 1020080083498 | 9/2008 |

OTHER PUBLICATIONS

European Search Report and Search Opinion received for EP Patent Application No. 19174187.5, dated Jun. 24, 2019, 8 pages.
Examination Report No. 1, for Australian Application No. 2013205167, dated Aug. 6, 2014, 3 pages.
Examination Report No. 1, for Australian Application No. 2015255311, dated Oct. 13, 2016, 3 pages.
Examination Report No. 1, for Australian Application No. 2017279643, dated May 1, 2016, 5 pages.
Examination Report No. 1, for Australian Application No. 2018100203, dated Apr. 27, 2018, 4 pages.
Examination Report No. 2, for Australian Application No. 2015255311, dated Jun. 20, 2017, 3 pages.
Examination Report No. 2, for Australian Application No. 2017279643, dated Sep. 4, 2018, 7 pages.
Examination Report No. 2, for Australian Application No. 2018100203, dated Sep. 4, 2018, 7 pages.
First Examination Report for Indian Application No. 2278/CHE/2013, dated Jun. 13, 2018, 7 pages.
Office Action received for Brazilian Patent Application No. BR102013013749-9, dated May 28, 2020, 6 pages (Partial English Translation).

(56) References Cited

OTHER PUBLICATIONS

Office Action received for Chinese Patent Application No. 201310218126.1, dated Jan. 14, 2016, 29 pages. (16 pages of English Translation and 13 pages of Office Action).
Office Action received for Chinese Patent Application No. 201310218126.1, dated Mar. 23, 2017, 21 pages. (13 pages of English Translation and 8 pages of Office Action).
Office Action received for Chinese Patent Application No. 201310218126.1, dated Sep. 19, 2016, 18 pages. (10 pages of English Translation and 8 pages of Office Action).
Office Action received for Chinese Patent Application No. 201810583266.1, dated Mar. 4, 2020, 15 pages. (8 pages of English Translation and 7 pages of Office Action).
Office Action received for European Patent Application No. 13169537.1, dated Aug. 21, 2017, 4 pages.
Office Action received for European Patent Application No. 14194099.9, dated Jun. 7, 2018, 4 pages.
Office Action received for Japanese Patent Application No. 2013-118998, dated Aug. 11, 2014, 8 pages. (4 pages of English Translation and 4 pages of Office Action).
Office Action received for Japanese Patent Application No. 2013-118998, dated Mar. 2, 2015, 5 pages (2 pages of English Translation and 3 pages of Office Action).
Office Action received for Korea Patent Application No. 10-2013-0064270, dated Mar. 27, 2015, 2 pages (1 pages of English Translation and 1 pages of Office Action).
Office Action received for Korean Patent Application No. 10-2013-0064270, dated Aug. 14, 2014, 20 pages (12 pages of English Translation and 8 pages of Office Action).
Sprint, "Kyocera DuraMax—User Guide" [retrieved from Internet on Oct. 16, 2019] URL: https://web.archive.org/web/20111226200941/https://support.sprint.com/global/pdf/user_guides/kyocera/duramax/kyocera_duramax_ug.pdf, published Dec. 26, 2011 as per Wayback Machine, 136 pages.
Cipriano, J., "How to decline a phone call with a custom text message on ICS" [retrieved from Internet on Oct. 16, 2019] URL: https://support.sprint.com/global/pdf/user_guides/kyocera/duramax/kyocera_duramax_ug.pdf, published Jan. 4, 2012, 19 pages.
Partial European Search Report, for corresponding European Patent Application No. 13169537.1, dated Sep. 23, 2013, 6 pages.
Extended European Search Report, for corresponding European Patent Application No. 13169537.1, dated Nov. 29, 2013, 12 pages.
European Search Report for European Patent Application No. EP14194099.9 dated Mar. 19, 2015.
State Intellectual Property Office, of the People's Republic of China for corresponding Chinese Patent Application No. 201310218126.1, dated Oct. 9, 2017, 1 page.
Communication pursuant to Article 94(3) EPC for EP Patent Application 19174187.5 filed May 13, 2019; EPO Form 2001 dated Dec. 11, 2020; 2 pp.
Examination Report for EP Patent Application 19174187.5 filed May 13, 2019; EPO Form 2906 dated Dec. 11, 2020; 3 pp.

* cited by examiner

OPTIONS PRESENTED ON A DEVICE OTHER THAN ACCEPT AND DECLINE FOR AN INCOMING CALL

This application is a continuation of co-pending U.S. application Ser. No. 14/810,325 filed Jul. 27, 2015, which is a continuation of U.S. application Ser. No. 13/488,696 filed on Jun. 5, 2012, now issued as U.S. Pat. No. 9,124,712.

FIELD OF THE INVENTION

The present invention relates to the computing sciences generally, and, more specifically, to options presented on a device, such as a smart phone, other than accept and decline for an incoming call.

BACKGROUND OF THE INVENTION

A common disadvantage with current incoming call screens on handheld devices is that a user can only accept the call, decline the call, or send the caller directly to voicemail. FIG. 1 shows a prior art incoming call display in which a handheld device displays to the user only the options to accept the call or decline the call. If the user instead wants to perform another action, such as to reply to the caller with an email instead of accepting the call, or be reminded to call the caller back, the user has to first decline the call and then separately access other features of the device, which consists of more steps and is more time consuming.

Published references directed to incoming call and/or reminder processing include Pub. U.S. App. 2009/0290696, Pub. U.S. App. 2005/0041793, U.S. Pat. Nos. 7,145,998 and 7,647,042.

SUMMARY OF THE DESCRIPTION

A data processing system of a handheld device is described that presents a triggered reminder for display on a touchscreen display, e.g., for an incoming call that was declined. The triggering of the triggered reminder can be based on information of one or more of a change to the device's currently configured operational state, a change to the front most application, a change to the device's location, and specific user looked for activity. A change in the state of the operational configured state can include a change to the networked state of the device. A change of the front most application can include a change of the front most application of the device between active and inactive. A change to the device's location, wherein GPS information is used by the device to understand the device's location, can include a future potential destination of the user, or the entering or leaving a feature on a map. The information can also include a change in specific user activity of pausing or stopping a movie currently playing in a media player.

A data processing system of a handheld device, in one embodiment, is described that offers a user of the device an option to accept an incoming call while simultaneously launching an application of the device. In one embodiment, this application can be a notes application.

A data processing system of a handheld device, in one embodiment, is described that presents different options to a user of the device for handling an incoming call based on different directions that the user swipes a display of the device.

A data processing system uses smart reminders, in one embodiment, to allow a user to decline an incoming call and to cause the system to set a smart reminder. In one embodiment, the system determines a current state of the device, such as the device is in a car or a media playing application is playing media (e.g., a movie) on the device, and presents an option for a reminder based on that current state, and when the state of the device changes, the reminder can be triggered. For example, if the device determines from an existing, established Bluetooth connection with the user's car that the device is in the car, when the user selects to be reminded, the system provides an option of "Remind Me When I Leave the Car"; when this option is selected, the system sets a reminder to occur when the device's pertinent state (in car) changes to another pertinent state (device is out of car based on loss of Bluetooth connection). In another embodiment, the device's GPS (Global Positioning System) receiver can be used to determine that, due to the high velocity of the GPS receiver, the device is in a car and act in the matter described herein even if Bluetooth connectivity is absent (or the device was not paired with the car's Bluetooth system).

In one embodiment, the nature and presentation of the reminder options depend upon the device's state or context. For example, if the device determines it is not in a car, then the reminder options relating to or referring to the car are not presented to the user. Similarly, if the device determines that a media player application (e.g. iTunes) is not playing media (e.g., a movie), then the reminder options relating to or referring to the media are not presented to the user.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the written discussion and figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
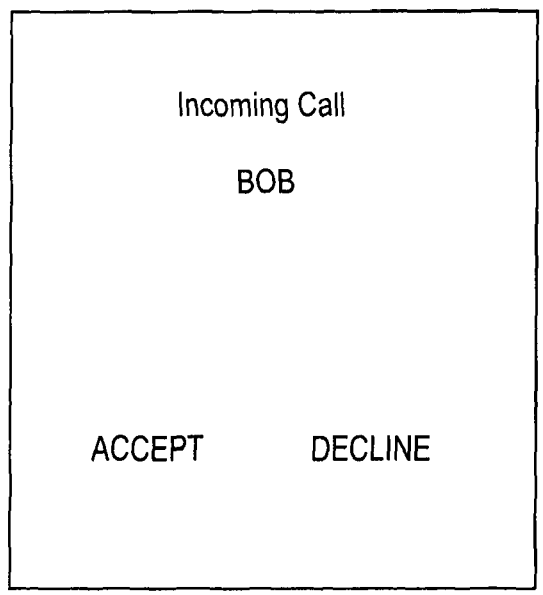
FIG. 1 (prior art) shows a GUI (Graphical User Interface) for handling an incoming call.
Figure 2:
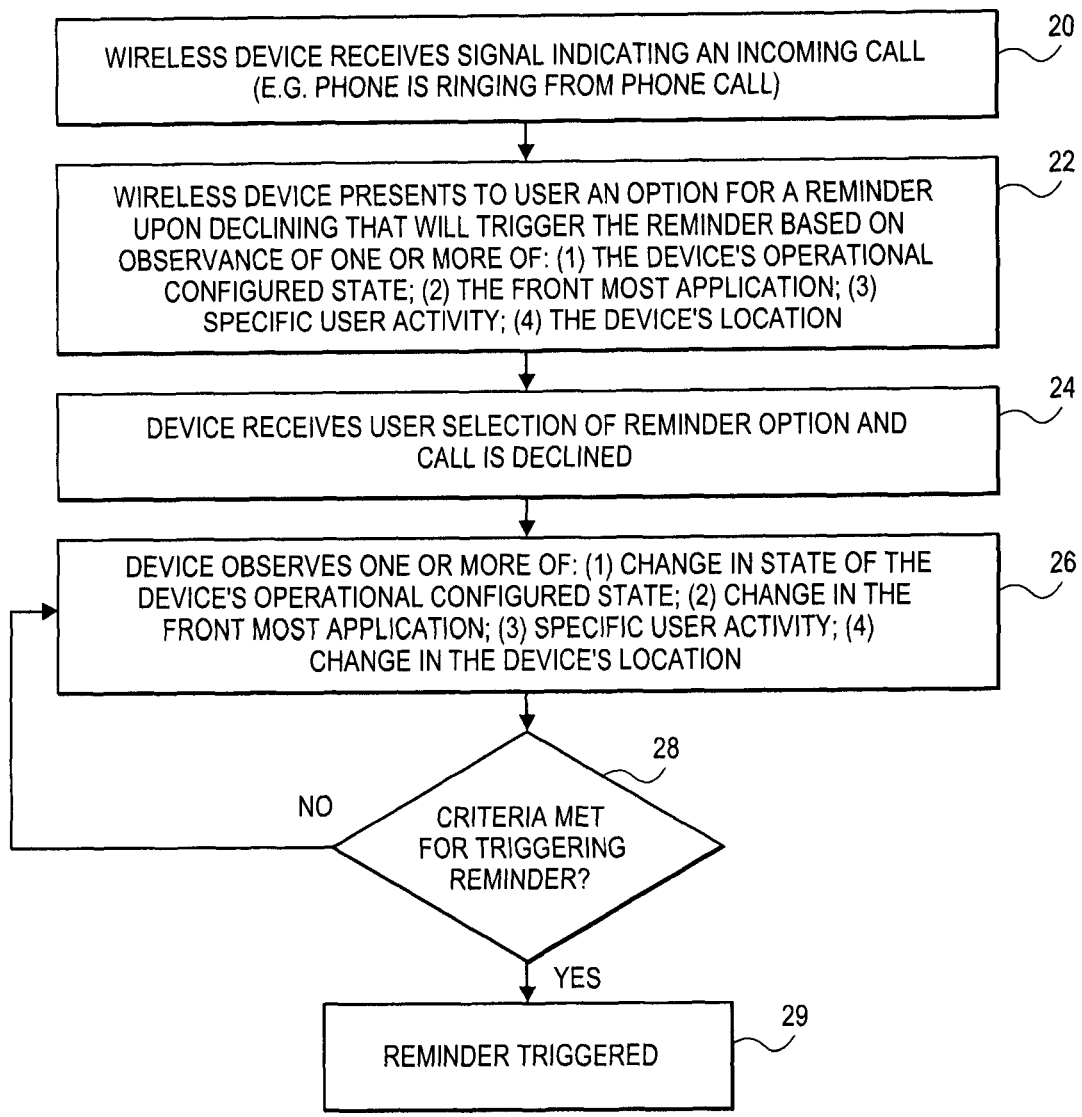
FIG. 2 shows an improved method for handling an incoming call.

FIG. 2 shows an example of a method according to one embodiment which reminds the user of an incoming call. Initially, as in operation 20, a wireless device receives a signal indicating an incoming call (e.g. phone is ringing from a phone call). After the incoming call has been received (but before it is accepted/answered by the user), the wireless device presents to the user, as in operation 22, an option for a reminder that will be triggered, after the call is declined, based on the device's observance of one or more of: (1) the device's operational configured state; (2) the front most application; (3) specific user activity; (4) the device's location; or (5) observed user or device behavior after the call is declined. In operation 24, the device receives the user's selection of the reminder option in lieu of accepting the call. In operation 26, the device observes of one or more of: (1) a change in the device's operational configured state; (2) a change in the front most application; (3) specific user activity; (4) a change in the device's location; or (5) observed user or device behavior after the call is declined. If, based on this observation, a determination is made that certain criteria are met in order for the reminder to the user to be triggered 28, the reminder is triggered 29. If the criteria have not been met, then the device continues to observe until the appropriate trigger condition occurs.

The currently configured operational state of the device corresponds to the set of the device's currently enabled tasks. Thus, any change to the device's currently enabled set of tasks corresponds to a change to the device's currently configured operational state. The establishment or disestablishment of network connectivity, such as coupling to or de-coupling from a PAN, is an example of an event that corresponds to a change in the device's currently configured operational state. Also, any change made by the user or the device to the device's configuration corresponds to a change in configured operational state. Examples include the installation of a new application, the un-installation of a previously installed application or the turning on, or turning off network connectivity (such as the enablement/disablement of a WiFi function (e.g., by placing the device into or out of "airplane mode")).

However, the normal operation of an enabled application, such as the updating or otherwise changing of data within a currently executing application, for example, or an internal change in state of a dormant but enabled application, such as a background calendar, does not, in one embodiment, correspond to a change in the device's currently configured operational state.

Another basis for a reminder, apart from a change in the device's configured operational state, is a change in the device's "front loaded" or front most application. Examples include the launching or exiting of an application on a device designed to display a "front loaded" or front most application and no other application. The front most application typically has at least one input focus such as a focus for an input of text characters through an input device such as a keyboard. Examples include the closing of a movie application after the movie is finished playing.

Even another basis for the reminder, is specific user activity with the device. For example, a reminder may be based on a looked for act a user takes within a running application (front loaded or otherwise). For example, the reminder is triggered when a user "mutes" the device's front loaded music playing application, or, pauses or stops a currently playing movie.

Even another basis for the reminder is the current or future location of the device, which may be determined based on GPS and/or other coordinate tracking information.

Figure 3A:
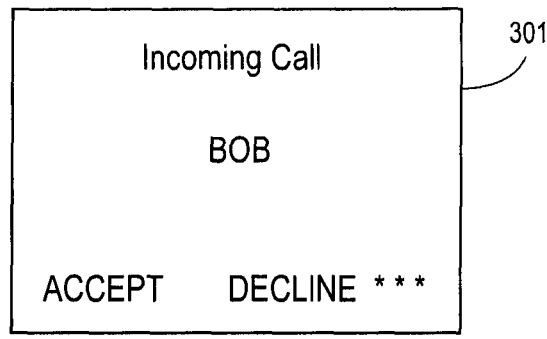
FIGS. 3A-3C show an exemplary sequence of GUI screens that illustrate an embodiment of the methodology of FIG. 2.
Figure 3B:
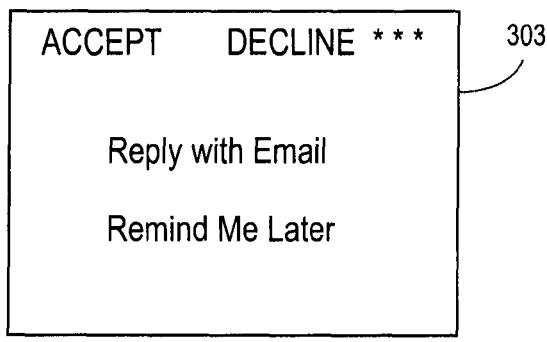
Figure 3C:
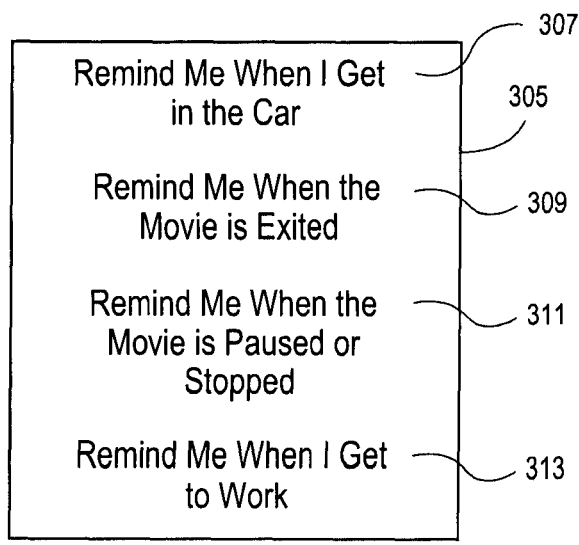

FIGS. 3A-3C show a first embodiment of a Graphical User Interface (GUI) that presents a user with more extensive options than the prior art approach upon the receipt of an incoming call. This GUI can be a touch input user interface on a handheld wireless device such as a smart phone (e.g. an iPhone® from Apple Inc. of Cupertino, Calif.), and each word "ACCEPT" or "DECLINE".

As shown in FIGS. 3A-3B, the improved incoming call display gives the user, according to one embodiment, the added ability to access an option UI 301. For example, the option UI 301 can be selected by being slid upwards by the user, enlarging the portion of the screen devoted to presenting various options to the user, as in FIG. 3B. This option UI contains options for the user to select, such as, in one embodiment, "Reply With Email" or "Remind Me Later" 303; these options can be selected by a user tapping on one of the options.

In an embodiment, if the "Remind Me Later" option 303 is selected, a reminder UI 305 is presented to the user as shown in FIG. 3C. The reminder UI 305 presents different reminders to the user, such as, in an embodiment, "Remind Me When I Get in the Car," 307 "Remind Me When The Movie is Exited," 309 "Remind Me When the Movie is Paused or Stopped" 311 and "Remind Me When I Get to Work" 313. The order of these options may be intuitive, or smart. According to one embodiment this means the most frequently selected reminder option floats to the first position of the list, the second most frequently selected reminder option floats to the second position of the list, and so on. According to other embodiments, the reminder options that are presented to the user are based on the device's understanding of its current state at the moment the call arrives. For example, if the device detects (from its personal area network connection with a car) that it is within the user's car it will present a "Remind Me When I Leave the Car", by contrast, if the device detects that it is outside the user's car it will present a "Remind Me When I Get In the Car". Notably, according to this approach, both options would not nominally be presented simultaneously. According to the embodiment of FIG. 3C, the "Remind Me When I Get in the Car" option 307 is presented when the device detects beforehand or at least concurrently with the incoming call that the device is not within a car, and, upon the incoming call, presents an option 307 to remind the user after the user gets into the car. Here, automobiles are understood to be capable of having personal area network technology with binding and/or pairing technology that can functionally bind or pair a specific handheld device with a specific car; Bluetooth is a known example of such technology. Said another way, the car and/or device can determine when the user of the device is within (or proximate to) the same user's car, and, if the user's device is within (or proximate to) the same user's car, the user's automobile and device can exchange information. In this embodiment, initially, the device detects that it is not within the user's car. That is, at this point in time, the device detects that it is not connected by way of a network, such as a personal area network connection (PAN) to the user's car.

After the incoming call has been detected but before being accepted or declined, the wireless device presents the user with a set of menu options to process the call: (1) accept; (2) decline; and (3) remind. The device receives the user's selection to remind the user of the call when the user/device is in the user's car 307. As a result of this selection, thereafter, the device can determine when to remind the user by (1) sensing when a PAN connection, such as Bluetooth, is established between his device and his car. As such, note that the basis for triggering the reminder is an observed detected state of the device (or change in the configured operational state of the device) after the call is declined.

Another embodiment, such as, "Remind Me When I Leave the Car" (not shown) can be presented when the device detects beforehand, or at least concurrently with the incoming call, that the device is within a car, and, upon the incoming call, presents an option to remind the user after the user leaves the car. In this case, for example, the device detects that it is connected by way of a PAN to the user's car. After the incoming call has been detected but before being accepted or declined, the wireless device presents the user with a set of menu options to process the call: (1) accept; (2) decline; and (3) remind. The device receives the user's selection to remind the user when the user leaves the car. As a result of this selection, the device can determine when to remind the user by sensing when a PAN connection, such as Bluetooth, that is associated with the user's car is no longer established between his device and his car. This is an example of the reminder being triggered in response to a change in the device's configured operational state.

According to the embodiment of FIG. 3C, the "Remind Me When the Movie is Exited" option 309 is presented if a movie application is currently playing a movie when the incoming call is made. Again, note that an option 309 is triggered based on the device's understanding/awareness of a presence of a front loaded application currently playing a movie. Specifically, the device is aware that it is currently playing a movie and therefore offers a reminder option 309 to remind when the front loaded movie application is exited. In various embodiments, different combinations of reminder options are presented to the user based on the device's understanding of its current configured operational state, front loaded application, specific user activity, or its location. For example, if the device understands it is currently playing a movie and is outside the user's car when the call arrives, the device can be smart enough to present options 307 and 309.

If option 309 is selected by the user, the user will be reminded of a declined incoming call upon the front most movie application being exited. To more fully explain this particular embodiment, a wireless device receives a signal indicating an incoming call (e.g. phone is ringing from phone call). At this point in time, the device is aware that is has a media player playing content on the device. After the incoming call has been detected but before accepted, the device therefore offers to the user the "Remind Me When the Movie is Exited" option 309. If the user selects this option 309, the device can determine when to remind the user of the declined incoming call by sensing when the front loaded application playing the movie is exited. Thus the device observes the current state of the front loaded application after the call is declined and then decides to present a reminder upon a looked-for state (or looked for change in the front loaded application playing a movie) being detected.

According to the embodiment of FIG. 3C, the "Remind Me When the Movie is Paused or Stopped" option 311 is presented if a movie application is currently playing a movie when the incoming call is made. Again, note that an option 311 is triggered based on the device's understanding/awareness of certain specific user activity, such as pausing or stopping the currently playing a movie, that could take place. Specifically, the device is aware that it is currently playing a movie and therefore offers a reminder option 311 to remind when the movie is paused or stopped by the user. This differs from the front loaded movie application being exited. Here, the front loaded movie application need not be exited in order for a movie to be paused or stopped.

If option 311 is selected by the user, the user will be reminded of a declined incoming call upon the movie being played in a front loaded movie application being paused or stopped by the user. To more fully explain this particular embodiment, a wireless device receives a signal indicating an incoming call (e.g. phone is ringing from phone call). At this point in time, the device is aware that is has a media player playing content on the device. After the incoming call has been detected but before accepted, the device therefore offers to the user the "Remind Me When the Movie is Paused or Stopped" option 311. If the user selects this option 311, the device can determine when to remind the user of the declined incoming call by sensing when the movie in the front loaded application playing the movie is paused or stopped by the user. Thus the device observes the current state of the movie playing in the front loaded application after the call is declined and then decides to present a reminder upon a looked-for specific user activity being detected.

According to the embodiment of FIG. 3C, the "Remind Me When I Get to Work" option 313 is presented when the device detects beforehand or at least concurrently with the incoming call that the device is not within or proximate to the user's workplace location, and, upon the incoming call, presents an option 313 to remind the user after the device's location is within the location designated as the user's workplace. Here, handheld devices are understood to be capable of having GPS mapping technology to determine the location of the device and compare that location to preprogrammed locations, such as "work," "home," etc. Said another way, the device can determine when the user of the device is within (or proximate to) a preprogrammed destination, and, if the user's device is within (or proximate to) the preprogrammed destination, the device has the ability to recognize this. In this embodiment, initially, the device detects that its location is not at the user's workplace.

After the incoming call has been detected but before being accepted or declined, the wireless device presents the user with a set of menu options to process the call: (1) accept; (2) decline; and (3) remind. The device receives the user's selection to remind the user of the call when the user/device is at the user's workplace 313. As a result of this selection, thereafter, the device can determine when to remind the user by sensing when the device is within (or proximate to) the user's workplace. As such, note that the basis for triggering the reminder is an observed detected location of the device after the call is declined.

If option 313 is selected by the user, the user will be reminded of a declined incoming call upon the device recognizing where the user's workplace is and arriving at the user's workplace. The location of the user's workplace, in this embodiment, is already stored in the device and labeled "work." To more fully explain this particular embodiment, a wireless device receives a signal indicating an incoming call (e.g. phone is ringing from call). At this point in time, the device is aware that its current location is not at the work. After an incoming call has been detected but before accepted, the device therefore offers to the user the "Remind Me When I Get to Work" option 313. If the user selects this option 313, the device can determine when to remind the user of the declined incoming call by sensing when the location of the device within or proximate to the user's workplace. Thus the device observes the current location of the device after the call is declined and then decides to present a reminder upon a looked-for location of the device being detected.

The reader will appreciate that a large number of different types of detected device states before/during/after an incoming call, and/or associated device state changes or user activity after the call is declined can be used as a basis for generating and triggering a reminder. For example, another type of reminder embodiment consists of offering a reminder option that is based on the device's understanding of relationships between contacts within the device's contact list. For example, the device may offer the user a "Remind Me to Call Dad After I Speak to Mom" option upon detecting an incoming call from "mom" and recognizing a strong relationship for a "dad" entry in the user's contact information to the user's "mom" entry in the user's contact information. Upon the selection of this option, the device detects when the call to "Mom" has terminated. The device then presents the reminder to the user based upon this event to call "Dad." Here, the device detects the networked state of the device concurrently with the incoming call (i.e., incoming call is from mom), and observes device state subsequent to the call to trigger the call (call with mom is terminated). In this example, moreover, the reminder is offered as part of accepting rather than declining the call.

Apart from detected device state, state change and/or user activity, the reader will further appreciate that the current location of the device can also be used as a basis for intelligent reminders (either separately or in combination with detected device state). For example, GPS information can be used to formulate appropriate reminder options and corresponding reminder triggers. An example includes screening GPS information against map coordinate information to understand where the device currently is and offer reminder options and reminder triggers accordingly (e.g., "Remind After You Are Outside The Train Station ?", "Remind After You Are Off The Road ?", "Remind When You Are Inside The Airport?", "Reminder After You Are Outside the Airport?", "Remind When You Are [5 mile/10 miles/15 miles] From Home?").

Changes in GPS information can also be monitored to understand where the user is actually traveling or not. That is, rapid changes in GPS information over time correspond to the movement of some velocity. If the device detects that the user is traveling at the moment the call arrives the device may present a "Remind When You Have Stopped Traveling?" reminder and trigger the reminder when the post declined call observed GPS information indicates that the user has been in substantially the same location for some threshold of time. Awareness of traveling in combination with map information can be integrated to form smart reminders in the form of destinations that reside ahead should the device continue on its present path (e.g., "Reminder at Exit 117?"; "Reminder When You Get To New York City"?).

Similarly, the device can utilize its GPS location settings and map coordinates to determine the location and travel of the device and offer a time based reminder ahead of its possible destination. For example, in an embodiment, the device can offer the option to "Remind Me When I Am 20 Minutes From Home." Assuming the device has stored the address of the user's home, the device can remind the user of the incoming call when the device senses that the user is 20 minutes, for example, from home by determining the proximity the device is to the user's home and current rate of speed the device is travelling. Further embodiments can be "Remind Me at the Time I am Usually Going Home" etc. More locations can be stored, such as, and as described previously, the user's workplace location. If a business contact were to call the user, the user can be presented with the option to "Remind Me When I Get to Work." The device would then, as in the examples above, use the GPS to detect when the device is at work and upon detecting this, would then offer to the user a reminder of the incoming call from the business contact.

Figure 4:
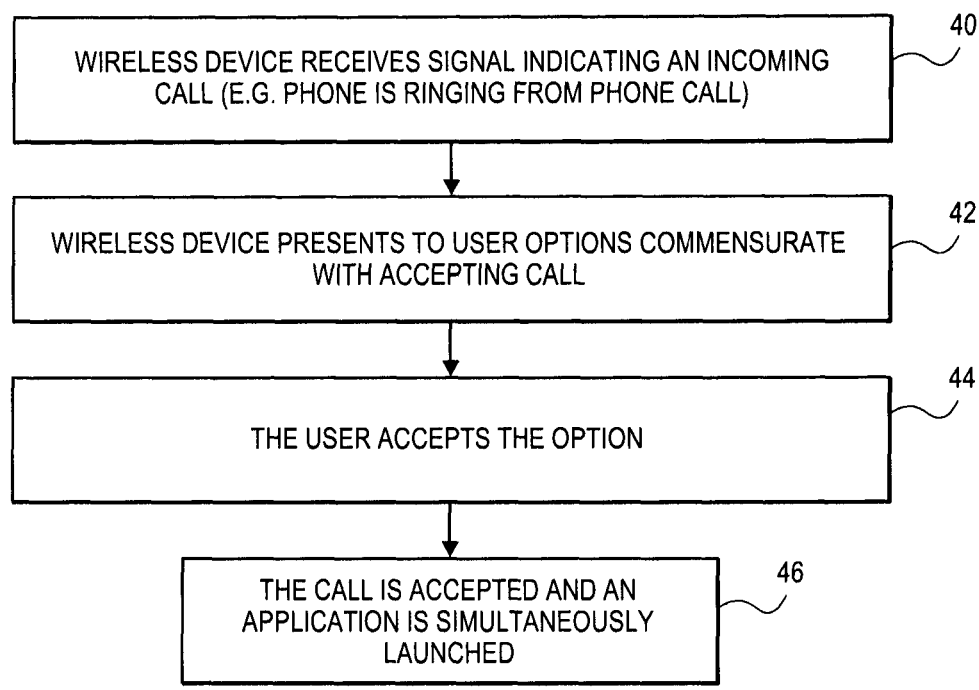
FIG. 4 shows another improved method for handling an incoming call.

FIG. 4 shows an example of another method according to one embodiment of the present invention which presents an option for launching an application commensurate with the acceptance of an incoming call. Initially, as in operation 40, a wireless device receives a signal indicating an incoming call (e.g. phone is ringing from a phone call). After the incoming call has been received (but before it is accepted/answered by the user), the wireless device presents to the user, as in operation 42, an option for launching (or otherwise transitioning the device's active screen to) an application commensurate with the acceptance of the incoming call. In operation 44, the device receives the user's selection of the option. In operation 46, the call is accepted and an application is simultaneously launched or otherwise actively transitioned to. In one embodiment, the device senses who the caller is by matching the caller's phone number with a contact, if available, in the stored contact list. The device can launch, in an embodiment, a notes or other text presentation application with information about the caller so that the user is better informed about the caller.

Figure 5:
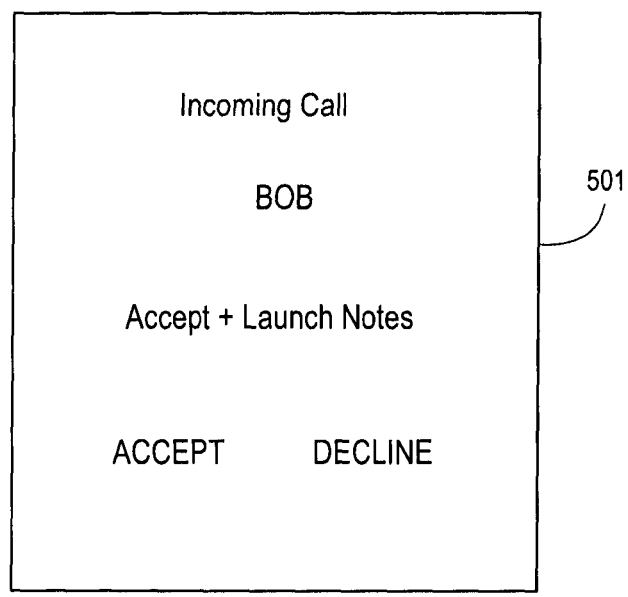
FIG. 5 shows an exemplary GUI that illustrates an embodiment of the methodology of FIG. 4.

FIG. 5 shows an embodiment of a Graphical User Interface (GUI) for the above described approach.

As shown in FIG. 5, the improved incoming call display gives the user the added ability to accept a call while simultaneously exercising another option. For example, if option 501 is selected, the call will be accepted and a notes application, in an embodiment, will be launched and presented to the user. This application does not have to be limited to the notes application, as one skilled in the art can appreciate but can be any one of a set of available applications.

Figure 6:
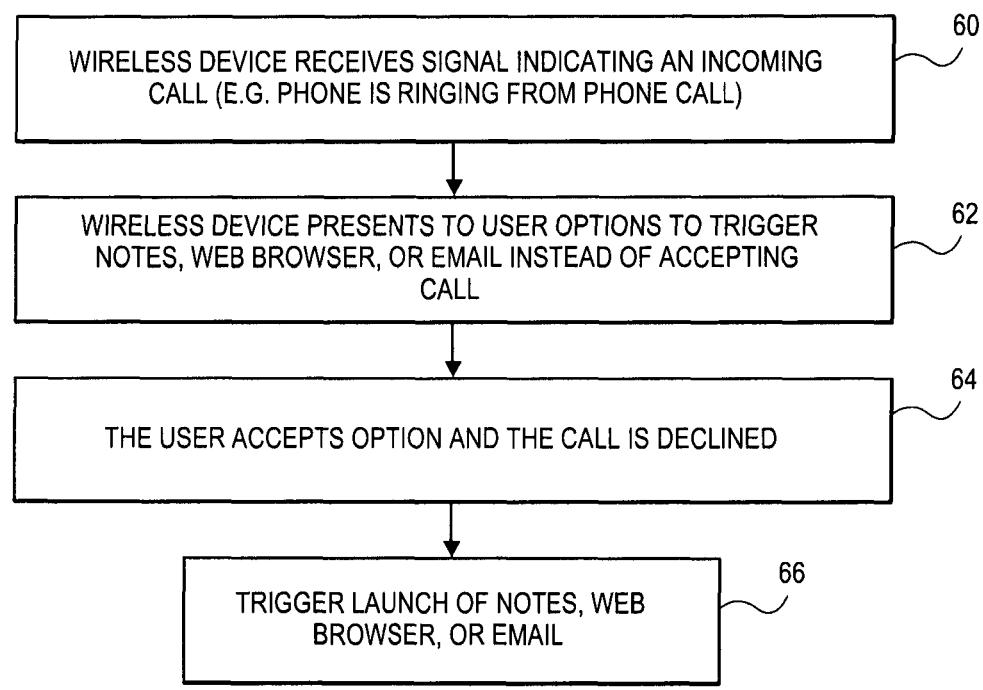
FIG. 6 shows another method for handling an incoming call.

FIG. 6 shows an example of another method according to one embodiment of the present invention which presents an option for the launch of a specific application upon the declining of an incoming call. Initially, as in operation 60, a wireless device receives a signal indicating an incoming call (e.g. phone is ringing from a phone call). After the incoming call has been received, the wireless device presents to the user, as in operation 62, one or more options that will decline the incoming call and perform any of: i) respond to the caller with an email; ii) launch a web browsing application; or, iii) launch notes that could contain, for example, specific information about the caller. In operation 64, the device receives the user's selection to accept an option while simultaneously declining the call. In operation 66, after the call has been declined, the device can trigger the launch of either an email application, a web browsing application, or a notes application.

Figure 7:
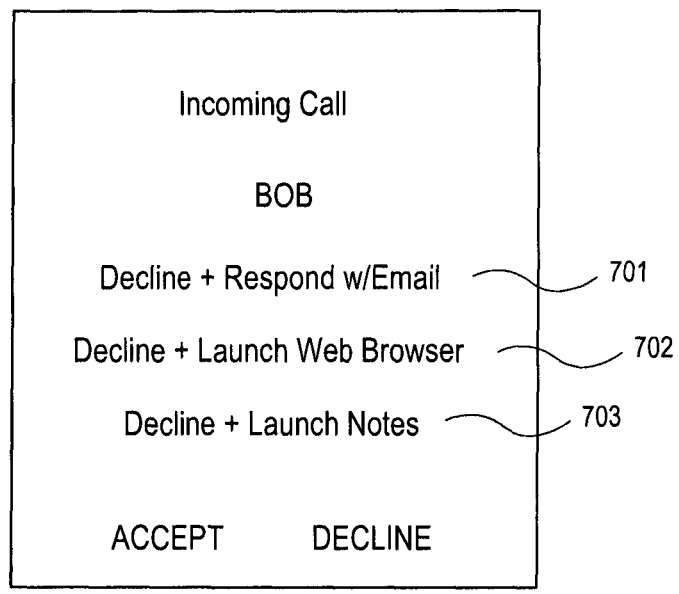
FIG. 7 shows an exemplary GUI that illustrates an embodiment of the methodology of FIG. 7.

FIG. 7 shows an embodiment of a Graphical User Interface (GUI) for the embodiment of FIG. 6 described above.

As shown in FIG. 7, the improved incoming call handling interface gives the user, according to one embodiment, the added ability to access options 701-703, each of which pertain to the launching or transitioning to a specific application commensurate with the user's decline of the call. If the user selects the option to decline the call and respond with an email 701, the incoming call is declined and the email application is launched. In a further embodiment, if the caller's information is stored in the device, the caller's email address will already be preloaded in email address field of the email application. This permits ease of response, wherein the user only has to type the message and hit send, as opposed to first declining the call, manually launching the email application, and then entering the caller's email address. If the user selects the option to decline the call and launch a web browsing application 702, the incoming call is declined and the device launches a web browsing application. If the user selects the option to decline the call and launch the notes application 703, the incoming call is declined and a notes application is launched. In a further embodiment, notes specifically pertaining to the caller can be presented to the user in the notes application so that the user can brush up on facts about the caller, before, say, returning the caller's call.

Figure 8:
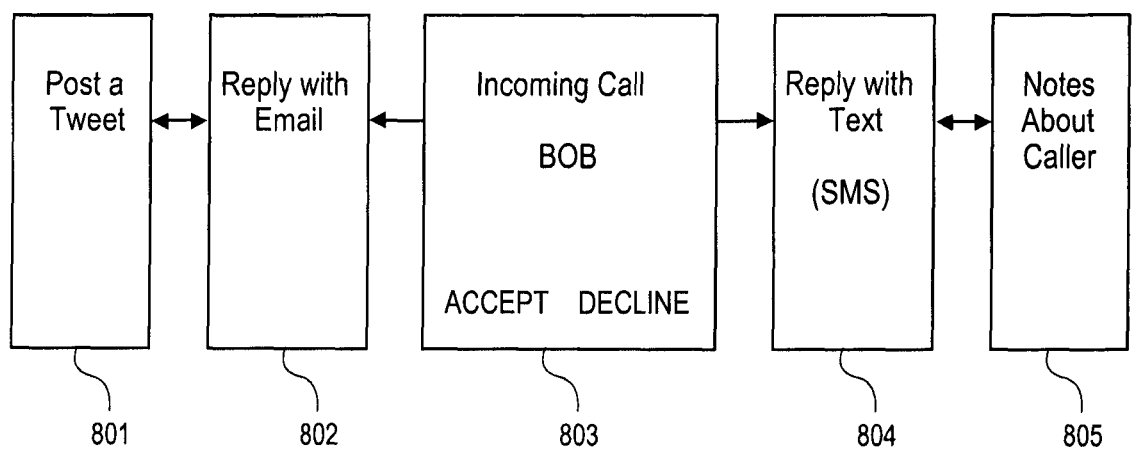
FIG. 8 shows a sequence of GUI screens illustrating another improved call handling method.

FIG. 8 shows another embodiment of a Graphical User Interface (GUI) flow for handling an incoming call.

As shown in FIG. 8, upon the receipt of an incoming call, options can be presented to the user when the user, in one embodiment, swipes the incoming call screen to the left or to the right by using a swipe gesture with a finger or stylus on a touch sensitive input device. In this case, the user proactively swipes the incoming call screen 803 to change the screen to various option screens. In one embodiment, one swipe to the right can present the user with a screen 804 to quickly send a text message to the caller. Two swipes to the right can present the user with a screen 805 to bring up notes about the caller so that the user can quickly brush up about details of the caller. One swipe to the left can bring up a screen 802 to enable the user to quickly reply to the caller with an email, wherein the caller's email address is automatically populated if that address is stored in the device. Two swipes to the left can bring up a screen 801 that will enable the user to respond to the incoming call by posting a blog event, like a tweet.

Another reminder embodiment that can be included with the displayed offering of any of the other reminders discussed above is a reminder option to remind the user when the user's calendar is free ("Remind When My Calendar is Free"). Upon the selection of this option, the device accesses the calendar application with the user's decline of the incoming call and locates the next available spot that the user's calendar is free from an obligation. The device then stores the incoming call reminder at this next available free slot. When the reminder is stored in the calendar can also be modified if, for example, the user decides to he wants to be reminded in a preset time, such as in 5, 10, or 15 minutes, etc. or in a time that the user enters manually.

Apart from reminders, call transfers may also be effected with logic that detects the device's state. In this case the device is not used to accept/reject the call but rather to forward the incoming call to another device. For example if the device detects that the device is coupled to or bound to another device, such as another computer or a landline phone, the device can cause the call to be transferred to one of these other devices. The device may be the user's device or another user's device. In the latter case, the offer to forward the call may be identify the other user rather than the other device (e.g., "Transfer Call to Bob?").

Figure 9:
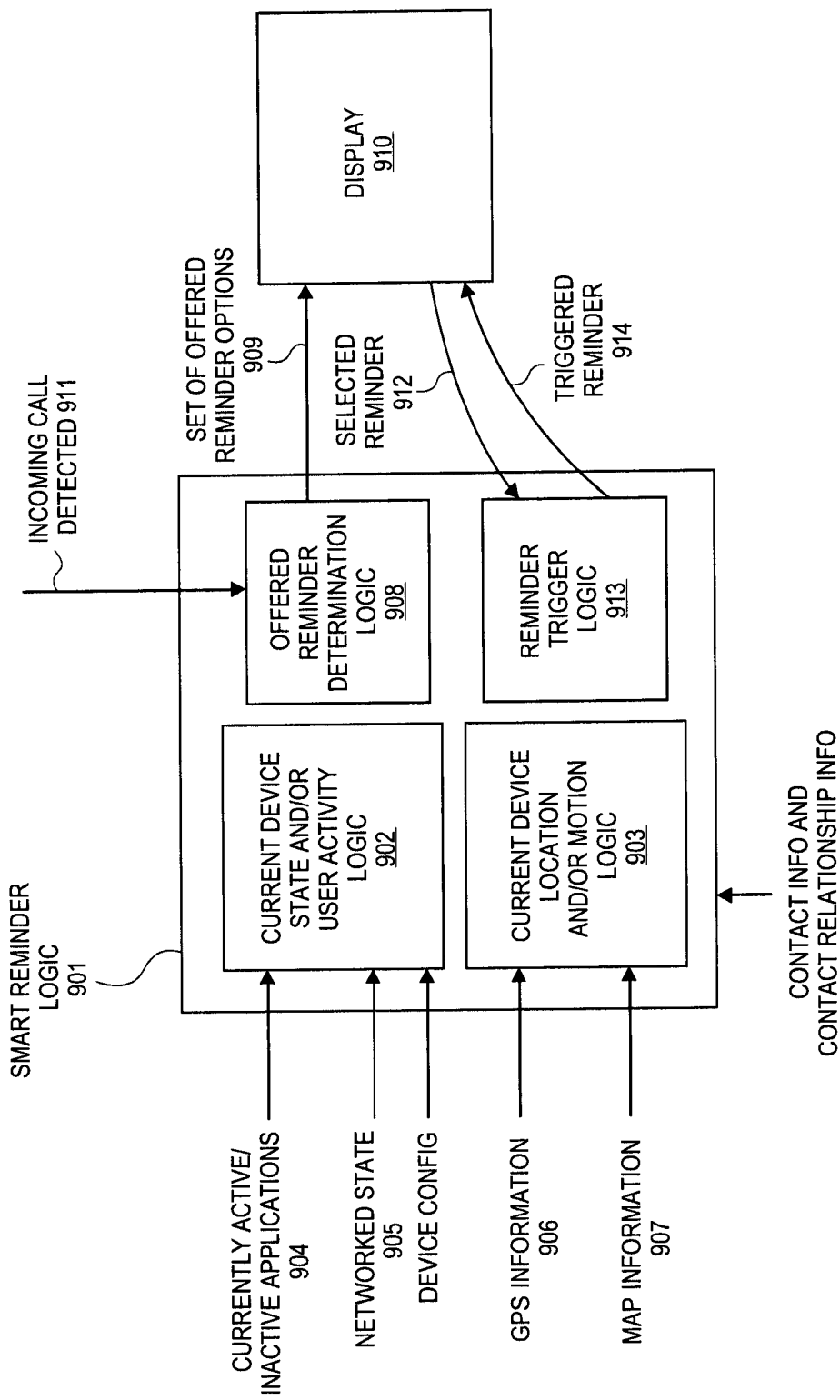
FIG. 9 shows an architecture for a device having smart reminder logic.

FIG. 9 shows an architecture of a data processing system for implementing the smart options as discussed above. According to the embodiment of FIG. 9, the device includes smart reminder logic 901 that includes either or both observed current device and/or user activity logic 902 and observed current device position and/or motion logic 903. Logic 902 is used to detect the device's current state and/or user activity. As such, as one possibility, logic 902 accepts as input information an understanding of the device's currently active application(s) 904 and/or currently engaged uses and/or networked state 905 (e.g., connection to PAN, no connection to PAN). Device configuration information may also be accepted (e.g., to offer a reminder that relies on detection of device state with a unit that is configurably enabled/disabled by the user). Logic 903 accepts input information in the form of GPS information 906 from a GPS receiver and map information 907.

Either or both of logic units 902, 903 can be used by offered reminder determination logic 908 to determine an appropriate set of reminders 909 for offering on the display 910 to the user upon the detection of an incoming call 911. Upon the user selecting 912 a particular one of these reminder options, reminder trigger logic 913 looks to appropriate ones of the detected awareness logic units 902, 903 to sense that the post observed state/activity condition has been met to display the reminder 914 on the display 910 at the proper moment. The reader will understand that any/all of the portions of the smart reminder logic 901 can be implemented in software (e.g., embedded in the operating system or as an application) or as semiconductor logic circuitry disposed on a semiconductor chip or in various combinations of the two.

Although the above embodiments have been described with reference to a smart phone with a touch input device that is integrated with a display for communication between the user and the device, other devices can use the various embodiments described herein. The reader will understand that voice technology where the user speaks to the device and the device likewise "speaks" to the user can be used instead partially or wholly. Moreover, devices with keyboards can be used with the embodiments described herein.

Note that any/all reminder options and associated triggered reminders may be presented to the user in various combinations which are too numerous to list here. Also, all of the above described embodiments can be interchanged, such as an option to respond to an incoming call by email can be offered after a movie finishes, or after the user leaves his car, etc. Therefore, both reminder options and other options can be presented to the user based on observance of one or more of: (1) the device's operational configured state; (2) the front most application; (3) specific user activity; and (4) the device's location.

Although the above described features were described in reference to a handheld device such as a smartphone, these same features may be incorporated onto other computing systems (mobile or otherwise) such as tablet computers (e.g., Apple, Inc.'s iPad), netbook computers, notebook computers, laptop computers, personal desktop computers, etc.). In cases where the above description described user interoperability in terms of a touch screen, for systems not having a touch screen, such interoperability could be readily achieved with some form of cursor control (e.g., as with a mouse) and keyboard keystrokes.

Figure 10:
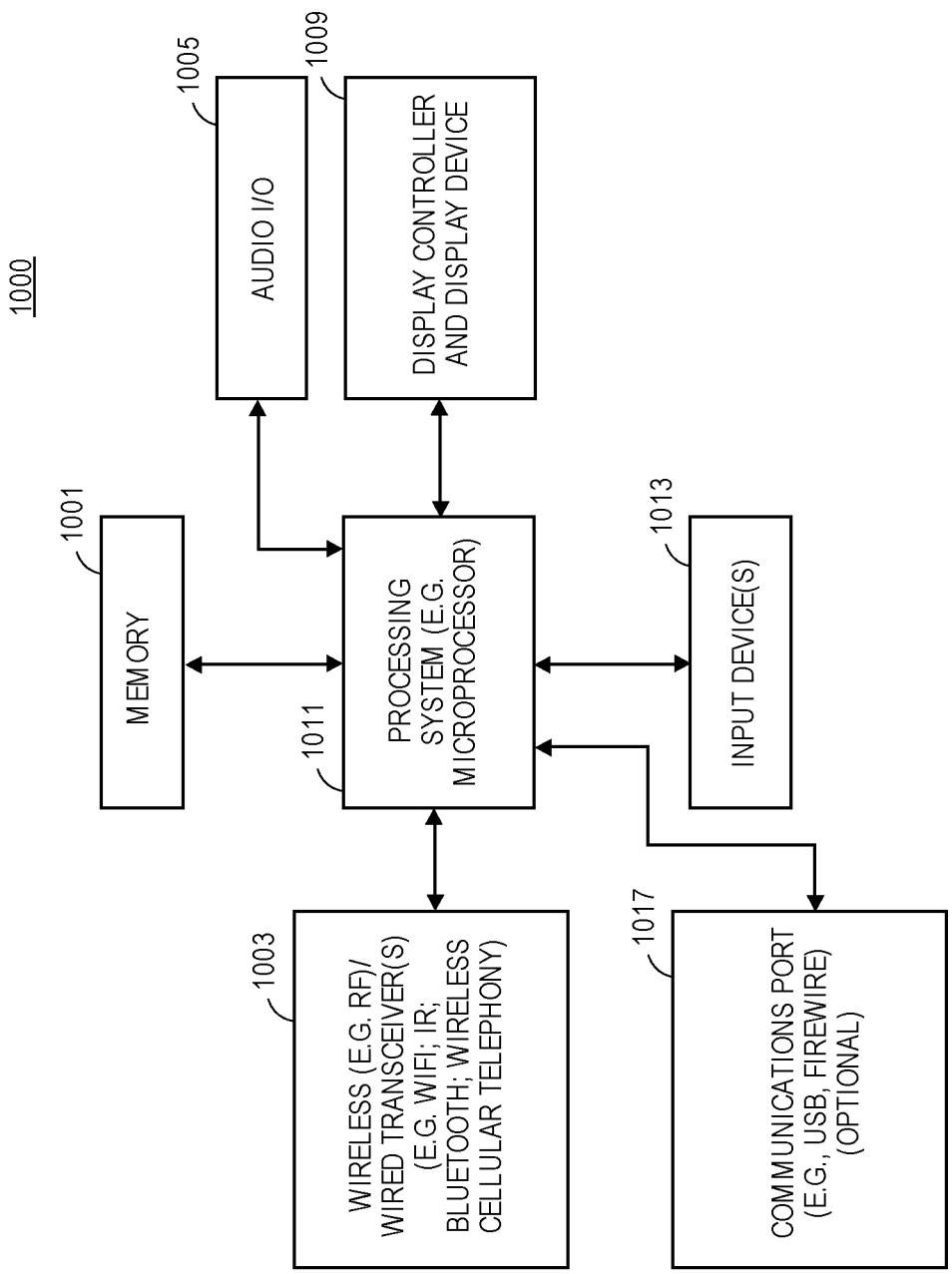
FIG. 10 shows an example of a data processing system which can be used with one or more embodiments of the present invention.

FIG. 10 shows an example of data processing system 1000 which may be used with one embodiment of the present invention. For example and in one embodiment, system 1000 may be implemented as a portable data processing device such as a smartphone or tablet (e.g., iPad) device or a laptop or an entertainment system. The data processing system 1000 shown in FIG. 10 includes a processing system 1011, which may be one or more microprocessors or which may be a system on a chip (integrated circuit) and the system also includes memory 1001 for storing data and programs for execution by the processing system. The memory 1001 can store, for example, the software components described in conjunction with one or more of the embodiments described herein and memory 1001 can be any known form of a machine readable non-transitory storage medium, such as semiconductor memory (e.g., flash; DRAM; SRAM; etc.) The system 1000 also includes an audio input/output subsystem 1005 which may include a microphone and a speaker for, for example, playing back music or providing telephone functionality through the speaker and microphone.

A display controller and display device 1009 can provide a visual user interface for the user; this interface may include a graphical user interface which is similar to that shown on a Macintosh computer when running OS X operating system software or iOS software on an iPhone or iPad. The system 1000 can also include one or more wireless transceivers 1003 to communicate with another data processing system. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 1000 in certain embodiments, and in certain embodiments fewer components than shown in FIG. 10 may also be used in a data processing system. The system 1000 further can include one or more communications ports 1017 to communicate with another data processing system. The communications port may be a USB port, Firewire port, Bluetooth interface, a docking port, etc.

The data processing system 1000 can also include one or more input devices 1013 which are provided to allow a user to provide input to the system. These input devices may be a keypad or a keyboard or a touch panel or a multi-touch panel which is overlaid and integrated with a display device such as display device 1009. The data processing system 1000 can also include an optional input/output device which may be a connector for a dock. It will be appreciated that one or more buses, not shown, may be used to interconnect the various components as is well known in the art. The data processing system shown in FIG. 10 may be a desktop computer, a handheld computer or a personal digital assistant (PDA), or a cellular telephone with PDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 1000 may be a network computer or an embedded processing device within another device, or other types of data processing systems which have fewer components or perhaps more components than that shown in FIG. 10.

Data processing system 1000 can optionally include one or more hardware devices designed to digitize and store human speech received by the microphone in Audio I/O 1005.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures. Moreover, the software which is obfuscated using one or more embodiments described herein can be software that is used to play the music or motion pictures or other content.

While FIG. 10 shows that the memory 1001 in the data processing system in FIG. 10 is a local device coupled directly to the rest of the components in the data processing system, it will be appreciated that the present invention may utilize storage which is remote from the system, such as a network storage device which is coupled to the data processing system through a network interface. Each bus in FIG. 10 may include one or more buses connected to each other through various bridges, controllers and/or adapters as is well known in the art.

It will be apparent from this description that aspects of the present invention may be embodied, at least in part, in software. That is, the techniques may be carried out in a handheld device in response to its processor/processing core, executing sequences of instructions contained in a machine readable non-transitory storage medium such as a memory (e.g., one or more memories in the data processing system shown in FIG. 10, such as flash memories, DRAM memory, SRAM memory, etc.). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system shown in FIG. 10.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
receiving an incoming call on a device having a current context;
in response to receiving the incoming call and prior to initiating a decline of the incoming call, concurrently displaying, via a graphical user interface on the device, a plurality of user interface elements, wherein the plurality of user interface elements includes:
an accept user interface element,
a first decline user interface element,
a second decline user interface element, and
a third decline user interface element;
receiving a user input corresponding to a tap of a user interface element of the plurality of user interface elements; and
in response to the user input:
in accordance with a determination that the user interface element corresponds to the accept user interface element, answer the incoming call,
in accordance with a determination that the user interface element corresponds to the first decline user interface element, decline the incoming call,
in accordance with a determination that the user interface element corresponds to the second decline user interface element, initiate a process to decline the incoming call and schedule a reminder to be triggered based on a change in the current context of the device, and
in accordance with a determination that the user interface element corresponds to the third decline user interface element, initiate a process to decline the incoming call and send a textual message.

2. The method of claim 1 further comprising declining, in response to the user input, the incoming call.

3. The method of claim 2, wherein each of the plurality of user interface elements is displayed based on the current context of the device as the current context exists concurrently with the incoming call.

4. The method of claim 1, wherein the current context of the device includes one or more of an operational configured state of the device, a front most application of the device, a specific user activity on the device, or a location of the device.

5. The method of claim 1, wherein the textual message is to be sent by an electronic messaging application.

6. The method of claim 5, wherein the electronic messaging application presents the textual message as an email message to be sent.

7. The method of claim 6, wherein the email message to be sent has an email address of a caller of the incoming call as an addressee of the email message.

8. A handheld device, comprising:
a radio frequency transceiver to receive an incoming call when the handheld device has a current context;
a touchscreen display to concurrently display, in response to receiving the incoming call and prior to initiating a decline of the incoming call, a plurality of user interface elements, wherein the plurality of user interface elements includes:
an accept user interface element,
a first decline user interface element,
a second decline user interface element, and
a third decline user interface element; and
one or more processors to
receive a user input corresponding to a tap of a user interface element of the plurality of user interface elements, and
in response to the user input:
in accordance with a determination that the user interface element corresponds to the accept user interface element, answer the incoming call,
in accordance with a determination that the user interface element corresponds to the first decline user interface element, decline the incoming call,
in accordance with a determination that the user interface element corresponds to the second decline user interface element, initiate a process to decline the incoming call and schedule a reminder to be triggered based on a change in the current-a context of the handheld device, and
in accordance with a determination that the user interface element corresponds to the third decline user interface element, initiate a process to decline the incoming call and send a textual message.

9. The handheld device of claim 8 further comprising declining, in response to the user input, the incoming call.

10. The handheld device of claim 8, wherein the current context of the handheld device includes one or more of an operational configured state of the handheld device, a front most application of the handheld device, a specific user activity on the handheld device, or a location of the handheld device.

11. The handheld device of claim 8 further comprising launching an electronic messaging application, in response to the user input.

12. The handheld device of claim 11, wherein the textual message is to be sent by the electronic messaging application.

13. The handheld device of claim 12, wherein the electronic messaging application presents the textual message as an email message to be sent.

14. The handheld device of claim 13, wherein the email message to be sent has an email address of a caller of the incoming call as an addressee of the email message.

15. A non-transitory machine readable medium having instructions stored thereon, which when processed by one or more processors of a device cause the device to perform a method comprising:
receiving an incoming call on a device having a current context;
in response to receiving the incoming call and prior to initiating a decline of the incoming call, concurrently displaying, via a graphical user interface on the device, a plurality of user interface elements, wherein the plurality of user interface elements includes:
an accept user interface element,
a first decline user interface element,
a second decline user interface element, and
a third decline user interface element;
receiving a user input corresponding to a tap of a user interface element of the plurality of user interface elements; and
in response to the user input:
in accordance with a determination that the user interface element corresponds to the accept user interface element, answer the incoming call,
in accordance with a determination that the user interface element corresponds to the first decline user interface element, decline the incoming call, in accordance with a determination that the user interface element corresponds to the second decline user interface element, initiate a process to decline the incoming call and schedule a reminder to be triggered based on a change in the current context of the device, and in accordance with a determination that the user interface element corresponds to the third decline user interface element, initiate a process to decline the incoming call and send a textual message.

16. The non-transitory machine readable medium of claim 15 further comprising declining, in response to the user input, the incoming call.

17. The non-transitory machine readable medium of claim 16, wherein each of the plurality of user interface elements is displayed based on the current context of the device as the current context exists concurrently with the incoming call.

18. The non-transitory machine readable medium of claim 15, wherein the current context of the device includes one or more of an operational configured state of the device, a front most application of the device, a specific user activity on the device, or a location of the device.

19. The non-transitory machine readable medium of claim 15, wherein the textual message is to be sent by an electronic messaging application.

20. The non-transitory machine readable medium of claim 19, wherein the electronic messaging application presents the textual message as an email message to be sent having an email address of a caller of the incoming call as an addressee of the email message.

* * * * *